(12) United States Patent
Loisel

(10) Patent No.: US 12,447,484 B2
(45) Date of Patent: Oct. 21, 2025

(54) METHOD AND DEVICE FOR ANALYSING A DEVICE FOR SPRAYING A PHARMACEUTICAL FLUID PRODUCT

(71) Applicant: APTAR FRANCE SAS, Le Neubourg (FR)

(72) Inventor: Vincent Loisel, Bonsecours (FR)

(73) Assignee: APTAR FRANCE SAS, Le Neubourg (FR)

(*) Notice: Subject to any disclaimer, the term of this patent is extended or adjusted under 35 U.S.C. 154(b) by 390 days.

(21) Appl. No.: 18/011,302

(22) PCT Filed: Jul. 1, 2021

(86) PCT No.: PCT/FR2021/051204
§ 371 (c)(1),
(2) Date: Dec. 19, 2022

(87) PCT Pub. No.: WO2022/003294
PCT Pub. Date: Jan. 6, 2022

(65) Prior Publication Data
US 2023/0191431 A1    Jun. 22, 2023

(30) Foreign Application Priority Data
Jul. 1, 2020  (FR) ...................... 2006943

(51) Int. Cl.
*B05B 7/08* (2006.01)
*A61M 15/08* (2006.01)
*G01K 11/12* (2021.01)

(52) U.S. Cl.
CPC ........... *B05B 7/0815* (2013.01); *A61M 15/08* (2013.01); *G01K 11/12* (2013.01);
(Continued)

(58) Field of Classification Search
CPC .......... G01K 11/12; G01K 11/20; B05B 1/00; B05B 12/00
See application file for complete search history.

(56) References Cited

U.S. PATENT DOCUMENTS

2016/0216108 A1* 7/2016 Bettinelli .............. B05B 12/004

FOREIGN PATENT DOCUMENTS

| EP | 3 047 912 A1 | 7/2016 |
| JP | 54-127347 A | 10/1979 |

(Continued)

OTHER PUBLICATIONS

International Preliminary Report on Patentability dated Dec. 13, 2022 with a Translation of the Written Opinion of the International Searching Authority in Application No. PCT/FR2021/051204.
(Continued)

*Primary Examiner* — Walter L Lindsay, Jr.
*Assistant Examiner* — Andrew V Do
(74) *Attorney, Agent, or Firm* — Sughrue Mion, PLLC

(57) ABSTRACT

A method for analysing a device for spraying a pharmaceutical fluid product including the following steps: providing a spray head of a device for spraying a pharmaceutical fluid product, the spray head having a spray orifice; providing a receiving surface having a plurality of discrete contact zones separated by voids, the contact zones capable of being coated with a heat sensitive material, bringing the receiving surface to a temperature T2, passing a flow of compressed gas through the spray orifice, the flow of compressed gas at a temperature T1 which differs from T2, sending the flow of compressed gas at temperature T1 onto the receiving surface at temperature T2, visualising the impact zone for the flow of compressed gas on the receiving surface, and analysing
(Continued)

Figure 1:
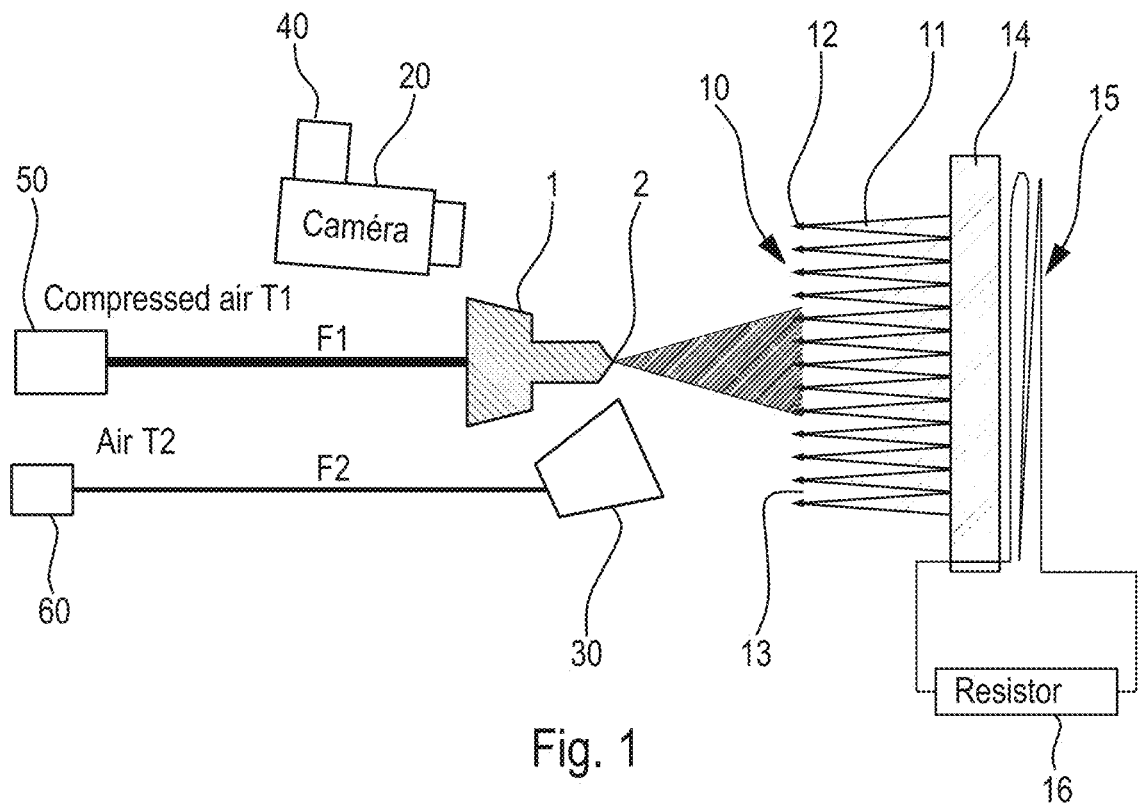

the visualisation of the impact zone in order to determine whether the spray head complies with predetermined specifications.

17 Claims, 2 Drawing Sheets

(52) U.S. Cl.
CPC ............... *A61M 2205/0227* (2013.01); *A61M 2205/3368* (2013.01); *A61M 2209/02* (2013.01)

(56) References Cited

FOREIGN PATENT DOCUMENTS

| | | |
|---|---|---|
| JP | 05-99802 A | 4/1993 |
| WO | 2018/130791 A1 | 7/2018 |

OTHER PUBLICATIONS

International Search Report PCT/FR2021/051204 dated Oct. 18, 2021 [PCT/ISA/210].

\* cited by examiner

METHOD AND DEVICE FOR ANALYSING A DEVICE FOR SPRAYING A PHARMACEUTICAL FLUID PRODUCT

CROSS REFERENCE TO RELATED APPLICATIONS

This application is a National Stage of International Application No. PCT/FR2021/051204, filed Jul. 1, 2021, claiming priority to French Patent Application No. 2006943, filed Jul. 1, 2020.

The present invention relates to a device and to a method for analysing a spray generated by a device for spraying a pharmaceutical fluid.

Devices for spraying pharmaceutical fluid are well known. They generally comprise a spray head provided with a spray orifice, assembled on a reservoir containing the fluid product to be distributed. Particularly in nasal spray applications, the therapeutic effectiveness of the sprayed fluid product may depend on the properties of the spray generated while the device is being actuated. At the end of the assembly line, i.e. once the spray device has been assembled and just prior to being sent to the pharmaceutical fluid manufacturer for assembly there onto a corresponding reservoir, it is known for a certain number of samples of assembled devices to be laboratory tested in order to check whether the properties of the spray correspond to pre-defined production specifications.

A disadvantage with that system is that it pertains to assembled devices, and thus destroys those devices which, after having been tested, can no longer be delivered to the customer.

In addition, the system requires human inspection of the tested devices, and is therefore not entirely suitable for being completely automated.

To overcome this disadvantage, the document WO 2018/130791 proposes visualization of a flow of hot or cold compressed air sent through a spray head by strioscopy. That method makes it possible to evaluate the angle of the spray, but not its geometry, nor its symmetry. This also has the disadvantage of having to provide a strioscopic bench, which is relatively complex and expensive, and which is difficult to adapt to an assembly line for a fluid spray device, and therefore involves either random tests carried out on only a portion of the manufactured devices, or slowing down the assembly line, which is generally undesirable.

Documents EP 3 047 912, JPH 0599802 and JPS 5412 7347 describe other prior art devices.

The aim of the present invention is to overcome the aforementioned disadvantages.

In particular, the aim of the present invention is to provide a device and a method for analysing a device for spraying a pharmaceutical fluid product that do not involve the destruction of the tested devices.

The present invention also aims to provide a device and a method for analysis which is substantially automated.

The present invention also aims to provide a device and method for analysis which makes it possible to test 100% of the spraying devices, without slowing down the assembly line to a substantial extent.

Another aim of the present invention is to provide a device and method for analysis which is simple and/or inexpensive to manufacture, assemble and use.

What is therefore presented is a method for analysing a device for spraying a pharmaceutical fluid product, comprising the following steps:

providing a spray head for a device for spraying a pharmaceutical fluid product, said spray head comprising a spray orifice;

providing a receiving surface comprising a plurality of discrete contact zones separated by voids, said contact zones being coated with a heat sensitive material, bringing said receiving surface to a temperature T2, passing a flow of compressed gas through said spray orifice of said spray head, said flow of compressed gas being at a temperature T1 which differs from T2, sending said flow of compressed gas at temperature T1 onto said receiving surface at temperature T2, visualising the impact zone for said flow of compressed gas on said receiving surface, and analysing said visualisation of said impact zone in order to determine whether or not said impact zone complies with predetermined specifications.

What is also presented is a method for analysing a device for spraying a pharmaceutical fluid product, comprising the following steps:

providing a spray head for a device for spraying a pharmaceutical fluid product, said spray head comprising a spray orifice;

providing a receiving surface comprising a plurality of discrete contact zones separated by voids, bringing said receiving surface to a temperature T2, passing a flow of compressed gas through said spray orifice of said spray head, said flow of compressed gas being at a temperature T1 which differs from T2, sending said flow of compressed gas at temperature T1 onto said receiving surface at temperature T2, visualising the impact zone for said flow of compressed gas on said receiving surface by means of a thermal camera, and analysing said visualisation of said impact zone in order to determine whether or not said impact zone complies with predetermined specifications.

Advantageously, said flow of compressed gas is a flow of compressed air.

Advantageously, said step for analysis comprises determining the geometry, in particular the symmetry, of the impact zone for said flow of compressed gas on said receiving surface.

Advantageously, said predetermined specifications comprise a predetermined planar extent of the impact zone for said flow of compressed gas on said receiving surface, in a manner such that the spray heads for which said planar extent is similar to said predetermined planar extent are classified as compliant, and the spray heads for which said planar extent is different from said predetermined planar extent are classified as non-compliant.

Advantageously, an operating cycle comprises the following steps:

sending said flow of compressed gas at temperature T1 onto said receiving surface at temperature T2, taking a first image of said receiving surface by means of a camera, sending a secondary flow of air at temperature T2 onto said receiving zone, taking a second image of said receiving surface, and subtracting the second image from the first image in order to visualise the impact zone.

Advantageously, the operating cycle comprises the following steps:

sending a secondary flow of air at temperature T2 onto said receiving zone, taking a first image of said receiving surface by means of a camera, sending said flow of compressed gas at temperature T1 onto said receiving surface at temperature T2, taking a second image of said receiving surface, and subtracting the first image from the second image in order to visualise the impact zone.

The present invention also concerns a device for analysing a device for spraying a pharmaceutical fluid product, comprising:

a spray head for a device for spraying a pharmaceutical fluid product, said spray head comprising a spray orifice;

a receiving surface comprising a plurality of discrete contact zones separated by voids, said contact zones being coated with a heat sensitive material, temperature regulating means for bringing said receiving surface to a temperature T2, means for generating a flow of compressed gas in order to pass a flow of compressed gas through said spray orifice of said spray head onto said receiving surface at temperature T2, said flow of compressed gas being at a temperature T1 which differs from T2, visualisation means such as a camera, in order to visualise the impact zone for said flow of compressed gas on said receiving surface, and means for analysis for the analysis of said visualisation of said impact zone in order to determine whether or not said impact zone complies with predetermined specifications.

The present invention also concerns a device for analysing a device for spraying a pharmaceutical fluid product, comprising:

a spray head for a device for spraying a pharmaceutical fluid product, said spray head comprising a spray orifice;

a receiving surface comprising a plurality of discrete contact zones separated by voids, temperature regulation means for bringing said receiving surface to a temperature T2, means for generating a flow of compressed gas in order to pass a flow of compressed gas through said spray orifice of said spray head onto said receiving surface at temperature T2, said flow of compressed gas being at a temperature T1 which differs from T2, a thermal camera for visualising the impact zone for said flow of compressed gas on said receiving surface, and means for analysis for the analysis of said visualisation of said impact zone in order to determine whether or not said impact zone complies with predetermined specifications.

Advantageously, said flow of compressed gas is a flow of compressed air.

Advantageously, said temperature regulation means comprise means for generating a secondary flow of air in order to generate a secondary flow of air at said temperature T2.

Advantageously, said temperature regulation means comprise heating wires and a resistor.

Advantageously, said receiving surface is formed by the ends of a plurality of points disposed in an array, said ends forming said contact zones.

Advantageously, said points are secured to a base.

Advantageously, said points are equidistant from and close to one another, thus forming a regular and dense array of contact zones on said receiving surface.

Advantageously, said heat sensitive material is a paint adapted to change colour as a function of temperature.

Advantageously, said means for generating a flow of compressed gas are adapted to generate pulses of adjustable duration, in particular from 50 to 300 ms.

Figure 2:
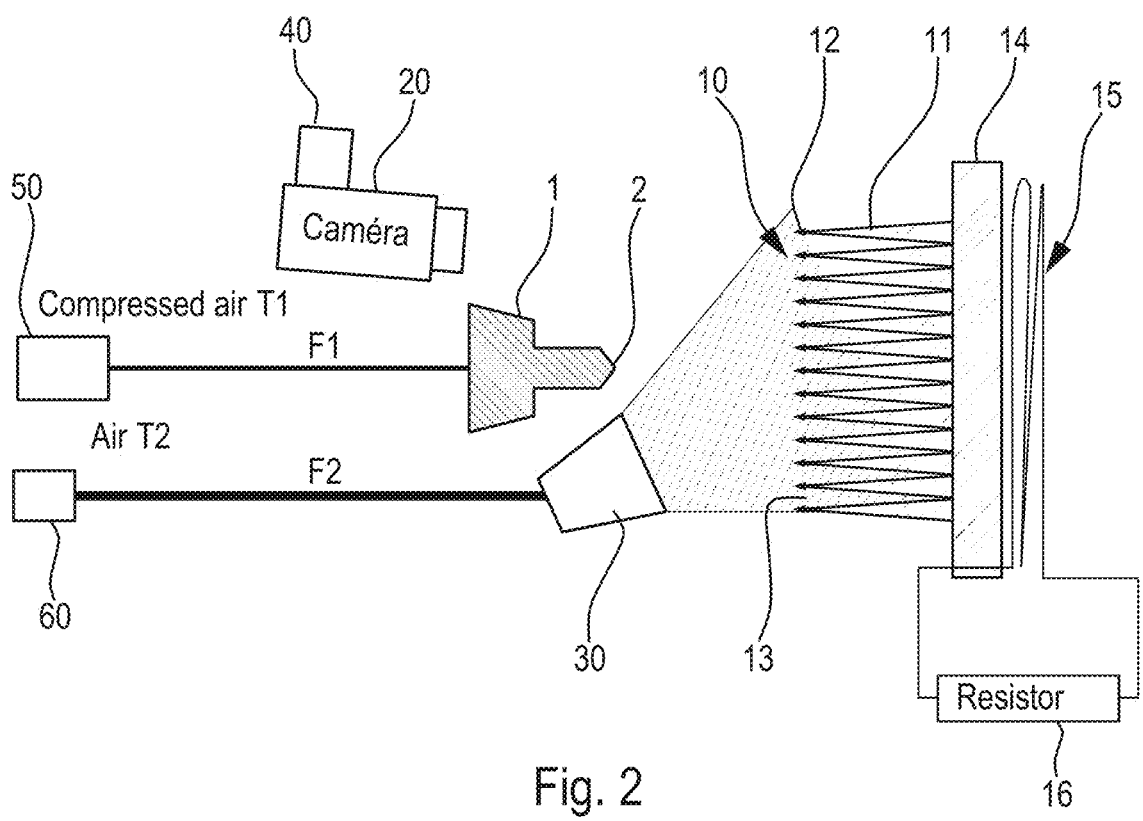
Figure 3:
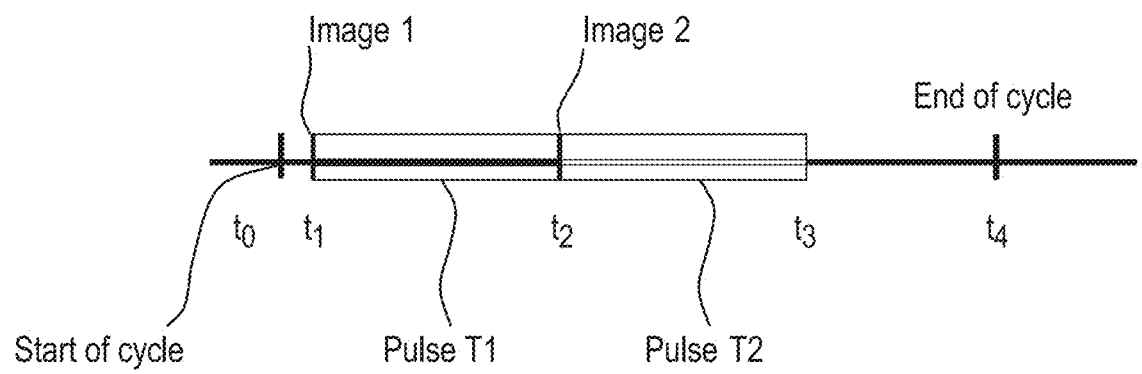
Figures 4, 5, 6:
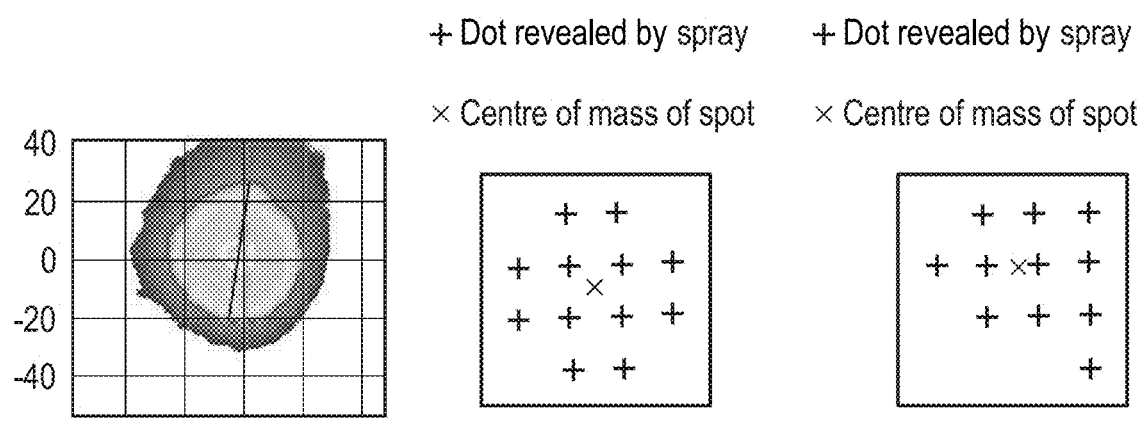

These and other features and advantages will become more apparent from the following detailed description, made with reference to the accompanying drawings and given by way of non-limiting examples, and in which:

FIG. 1 is a diagrammatic view of a device for analysing a spray device in accordance with an advantageous embodiment, in the first phase of an advantageous operating cycle, FIG. 2 is a diagrammatic view similar to that of FIG. 1, in the second phase of said operating cycle, FIG. 3 is a timeline for an operating cycle in accordance with an advantageous embodiment, FIG. 4 shows a thermal image obtained from an impact zone, and FIGS. 5 and 6 are diagrammatic views of the impact zone, respectively compliant and non-compliant.

One aim of the invention is to improve the quality of spray device inspection. To this end, the invention envisages the analysis of 100% of the devices, without substantially slowing down the assembly line.

In conventional manner, each spraying device comprises a spraying head 1 provided with a spraying orifice 2. In general, a spray profile (not shown) is provided upstream of said spray orifice 2 in order to generate a spray at the outlet from the orifice.

The present invention envisages passing a flow of compressed gas F1 through each spray head 1, and directing this flow F1 leaving the spray orifice 2 in the form of a conical spray towards a receiving surface 10, advantageously coated with a heat sensitive material which is capable of changing colour upon contact with the flow F1. Advantageously, the flow of compressed gas F1 is a flow of compressed air, but it should be understood that, in accordance with the invention, any suitable gas other than air could be used.

In the context of the present invention, the aim is to highlight a flow of compressed gas F1 at a temperature T1 which is different from the temperature T2 of the receiving surface 10, to observe it on this receiving surface 10 by means of a camera 20, and to analyse this observation by means of analysis means 40.

The flow of compressed gas F1 is at a temperature T1, and at the moment when this flow F1 is expelled through the spray orifice 2, the receiving surface 10 is at a temperature T2 which differs from T1.

In the example of FIGS. 1 to 3, the flow of compressed gas F1 is at a temperature T1 which is close to ambient temperature, and the receiving surface 10 is heated or cooled to a temperature T2 which is higher or lower than T1. As an example, the receiving surface 10 is heated to a temperature T2>T1.

In a variation, any combination of temperatures T1 and T2 could be envisaged, provided that the difference between these two temperatures T1-T2 OR T2-T1 is large enough to be detected by a heat sensitive material coating the reception surface 10 and/or by a thermal camera. Thus, for example, the receiving surface 10 could be at ambient temperature T2 and the flow of compressed gas F1 heated or cooled with respect to this ambient temperature T2.

FIG. 1 shows a device in an advantageous embodiment.

In this example, a spray head 1 is disposed opposite a receiving surface 10. Means 50 for generating a flow of compressed gas F1 are provided in order to cause a flow of compressed gas F1 at temperature T1 to pass through the spray head 1. A camera 20 is disposed facing the receiving surface 10, advantageously near the spray head 1, in order to take images of the receiving surface 10.

Temperature regulation means are provided in order to bring the receiving surface 10 to a temperature T2 just before and/or just after sending the flow of compressed gas F1. Advantageously, secondary air flow generation means 60 are provided in order to generate a secondary flow of air F2 at temperature T2 which differs from T1. This secondary flow of air F2 is sent onto the receiving surface 10 via a nozzle 30, alternating with the flow of compressed gas F1 passing through the spray head 1, in order to bring said receiving surface 10 to said temperature T2 before and/or after sending the flow F1. In a variation, the regulating means may comprise heating wires 15 and a resistor 16. Other regulating means are possible. Several different regulating means may be combined in order to guarantee that the receiving surface 10 is at the temperature T2 at the moment when the flow of compressed gas F1 is sent at temperature T1.

The receiving surface 10 forms a plane comprising a plurality of contact zones 12 separated from one another by a plurality of voids 13. In an advantageous embodiment, said contact zones 12 are coated with a heat sensitive material.

In the example shown, the receiving surface 10 is formed by the ends of a plurality of points 11 disposed in an array. These ends then form the contact zones 12. These points 11 may be integral with a base 14. Advantageously, temperature regulation means 15 may act on said base 14.

Advantageously, the points 11 are equidistant from and close to one another, thereby forming a regular and dense array of contact zones 12 on the receiving surface 10. The more points 11 there are and the smaller the contact zones 12, the more accurate will be the definition of the impact zone for the flow of compressed gas F1 on the reception surface 10 and the better will be the rendering of the shape of this impact zone.

In a variation of the points 11, a perforated plate or a grid could be used to form the receiving surface 10, in this case with the portions separating the holes forming the contact zones 12.

The heat sensitive material used to coat the contact zones 12 may be a paint adapted to change colour as a function of temperature. Thus, when the receiving surface 10 is at temperature T2, the contact zones 12 may have a first colour, and when the flow of compressed gas F1 at temperature T1 arrives on the receiving surface 10, the contact zones 12 touched by said flow F1 change colour, making it possible to visualise the impact zone of the flow F1 on the receiving surface 10. The camera 20 then makes it possible to take images, in particular thermal images, of this impact zone.

In another embodiment, the contact zones 12 are not covered with a heat sensitive material, and the camera 20 is a thermal camera which is capable of detecting the temperature differences between the flow of compressed gas F1 at temperature T1 and the reception zone 10 at temperature T2.

The particular shape of the receiving surface 10, with a plurality of discrete contact zones 12 separated by voids 13, means that a local contact can be made by the flow of compressed gas F1 on the contact zones 12, without dispersions and without perturbations to the flow, which makes the impact zone visible with great reliability.

In order to carry out the compliance evaluations, analysis means 40 are advantageously provided in order to analyse the images from the camera 20 and thus to determine whether the impact zone of the flow of compressed gas F1 originating from said spray head 1 onto the reception surface 10 is or is not compliant with the predetermined specifications. In particular, it is possible to provide for subtracting the image of the receiving surface 10 just before sending the flow F1 from the image of the receiving surface 10 just after sending the flow F1, which makes it possible to isolate the impact zone from the flow F1. In a variation, it is possible to subtract the image after the secondary flow of air F2 at temperature T2 has been sent from the image just after the flow of compressed gas F1 at temperature T1 has been sent.

FIG. 3 shows an advantageous operating cycle, with a first pulse of flow of compressed gas F1 at temperature T1 being sent onto the receiving surface 10 at time $t_1$, and a first image being taken at the same time $t_1$. Then, at time t2, the secondary flow of air F2 at temperature T2 is sent to the receiving surface 10, with a second image being taken at the same time.

In a variation, the first image could be taken after sending the secondary flow of air F2 at temperature T2 and the second image could be taken at the time of sending the flow of compressed gas F1 at temperature T1.

The duration of the compressed gas pulse F1 is advantageously adjustable, in particular from 50 to 300 ms. The duration of the secondary flow of air F2 is advantageously also adjustable.

Advantageously, a plurality of successive cycles are carried out on the same spray head, for example five cycles.

The consistency or repeatability of the results also makes it possible to evaluate the compliance of said spray head.

The predetermined specifications may comprise a predetermined planar extent of said impact zone on said support surface 10, in a manner such that the spray heads 1 for which said planar extent is similar to said predetermined planar extent are classified as compliant, and the spray heads 1 for which said planar extent is different from said predetermined planar extent are classified as non-compliant. The geometry, and in particular the symmetry, of the impact zone may also be used in the compliance evaluation. Other parameters may also be envisaged.

The analysis means 40 may comprise means for measuring the geometry of the impact zone of the flow of compressed gas F1 on the reception zone 10. As an example, the centre of mass of the impact zone is determined, and the maximum and minimum distances of this centre of mass from the edge of the impact zone are measured. Comparing these distances with predetermined values then makes it possible to evaluate the compliance of the tested device. Thus, the compliance evaluation takes not only the surface of the impact zone into account, but also its geometry, in particular its symmetry. This makes it possible to establish that a spray leaving a compliant spray head will have an acceptable conical shape, both from the point of view of the angle of the spray and as regards its symmetry. Advantageously, the temperature T1 and the flow rate of the flow of compressed gas F1 can be adjusted so as to best adapt the measurement of the impact zone, at a given distance from the spray orifice of the device under test, with respect to what could be obtained with a spray of liquid. This makes it possible to define a parameter setting that makes it possible to predict, as far as possible, the performance of each spray head in its final use, namely the distribution of liquid in the form of a spray.

Optionally, image processing means may be used to carry out this type of analysis.

FIGS. 4 and 5 illustrate an image and a diagrammatic representation obtained with the method and the device of the invention, in which it is possible to evaluate the planar extent and the geometry, in particular the symmetry, of the impact zone.

The present invention offers a number of advantages, and in particular:
- it enables various types of spray device to be inspected in an automated manner;
- it enables said spray devices to be analysed non-destructively;
- it makes it possible to analyse 100% of the spray devices assembled on an assembly line, without slowing down the assembly line substantially;
- it makes it possible to carry out several successive tests on the same device in order to evaluate the repeatability of the results;
- it uses a setup that is compact and that can easily be adapted;
- it uses components which are simple and standard, and thus generally inexpensive;
- it enables image processing to be robust, and it can be carried out in real time;
- it guarantees good repeatability and good discrimination between compliant and non-compliant devices.

The present invention has been described above with reference to several advantageous embodiments, but it should be understood that any modification could be applied thereto by a person skilled in the art without departing from the scope of the present invention as defined in the accompanying claims.

The invention claimed is:

1. A method for analysing a device for spraying a pharmaceutical fluid product, characterized in that it comprises the following steps:
   providing a spray head for a device for spraying a pharmaceutical fluid product, said spray head comprising a spray orifice,
   providing a receiving surface comprising a plurality of discrete contact zones separated by voids, said contact zones being coated with a heat sensitive material,
   bringing said receiving surface to a temperature T2,
   passing a flow of compressed gas through said spray orifice of said spray head, said flow of compressed gas being at a temperature T1 which differs from T2,
   sending said flow of compressed gas at temperature T1 onto said receiving surface at temperature T2,
   visualising the impact zone for said flow of compressed gas on said receiving surface, and
   analysing said visualisation of said impact zone in order to determine whether or not said impact zone complies with predetermined specifications.

2. A method as claimed in claim 1, in which said flow of compressed gas is a flow of compressed air.

3. The method as claimed in claim 1, in which said step for analysis comprises determining the geometry, in particular the symmetry, of the impact zone for said flow of compressed gas on said receiving surface.

4. The method as claimed in claim 1, in which said predetermined specifications comprise a predetermined planar extent of the impact zone for said flow of compressed gas on said receiving surface, in a manner such that the spray heads for which said planar extent is similar to said predetermined planar extent are classified as compliant, and the spray heads for which said planar extent is different from said predetermined planar extent are classified as non-compliant.

5. The method as claimed in claim 1, in which an operating cycle comprises the following steps:
   sending said flow of compressed gas at temperature T1 onto said receiving surface at temperature T2,
   taking a first image of said receiving surface by means of a camera,
   sending a secondary flow of air at temperature T2 onto said receiving zone,
   taking a second image of said receiving surface, and
   subtracting the second image from the first image in order to visualise the impact zone.

6. The method as claimed in claim 1, in which an operating cycle comprises the following steps:
   sending a secondary flow of air at temperature T2 onto said receiving zone,
   taking a first image of said receiving surface by means of a camera,
   sending said flow of compressed gas at temperature T1 onto said receiving surface at temperature T2,
   taking a second image of said receiving surface, and
   subtracting the first image from the second image in order to visualise the impact zone.

7. A method for analysing a device for spraying a pharmaceutical fluid product, characterized in that it comprises the following steps:
   providing a spray head for a device for spraying a pharmaceutical fluid product, said spray head comprising a spray orifice,
   providing a receiving surface comprising a plurality of discrete contact zones-separated by voids,
   bringing said receiving surface to a temperature T2,
   passing a flow of compressed gas through said spray orifice of said spray head, said flow of compressed gas being at a temperature T1 which differs from T2,
   sending said flow of compressed gas at temperature T1 onto said receiving surface at temperature T2,
   visualising the impact zone for said flow of compressed gas on said receiving surface by means of a thermal camera, and
   analysing said visualisation of said impact zone in order to determine whether or not said impact zone complies with predetermined specifications.

8. A device for analysing a device for spraying a pharmaceutical fluid product, characterized in that it comprises:
   a spray head for a device for spraying a pharmaceutical fluid product, said spray head comprising a spray orifice;
   a receiving surface comprising a plurality of discrete contact zones separated by voids, said contact zones being coated with a heat sensitive material,
   temperature regulating means for bringing said reception surface to a temperature T2,
   means (50) for generating a flow of compressed gas in order to pass a flow of compressed gas through said spray orifice of said spray head onto said receiving surface at temperature T2, said flow of compressed gas being at a temperature T1 which differs from T2,
   visualisation means, such as a camera, for visualising the impact zone for said flow of compressed gas on said receiving surface, and
   means for analysis for the analysis of said visualisation of said impact zone in order to determine whether or not said impact zone complies with predetermined specifications.

9. The device as claimed in claim 8, in which said flow of compressed gas is a flow of compressed air.

10. The device as claimed in claim 8, in which said temperature regulation means comprise means for generating a secondary flow of air in order to generate a secondary flow of air at said temperature T2.

11. The device as claimed in claim 8, in which said temperature regulating means comprise heating wires and a resistor.

12. The device as claimed in claim 8, in which said receiving surface is formed by the ends of a plurality of points disposed in an array, said ends forming said contact zones.

13. The device as claimed in claim 12, in which said points are integral with a base.

14. The device as claimed in claim 12, in which said points are equidistant from and close to one another, thereby forming a regular and dense array of contact zones on said receiving surface.

15. The device as claimed in claim 8, in which said heat sensitive material is a paint adapted to change colour as a function of temperature.

16. The device as claimed in claim 8, in which said means for generating a flow of compressed gas are adapted to generate pulses of adjustable duration, in particular from 50 to 300 ms.

17. A device for analysing a device for spraying a pharmaceutical fluid product, characterized in that it comprises:
- a spray head for a device for spraying a pharmaceutical fluid product, said spray head comprising a spray orifice;
- a receiving surface comprising a plurality of discrete contact zones separated by voids,
- temperature regulating means for bringing said reception surface to a temperature T2,
- means (50) for generating a flow of compressed gas in order to pass a flow of compressed gas through said spray orifice of said spray head onto said receiving surface at temperature T2, said flow of compressed gas being at a temperature T1 which differs from T2,
- a thermal camera for visualising the impact zone for said flow of compressed gas on said receiving surface, and
- means for analysis for the analysis of said visualisation of said impact zone in order to determine whether or not said impact zone complies with predetermined specifications.

* * * * *